UNITED STATES PATENT OFFICE.

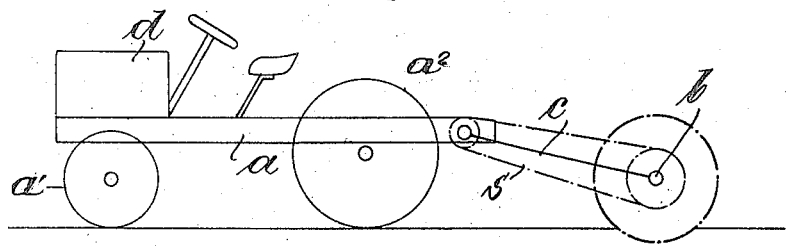
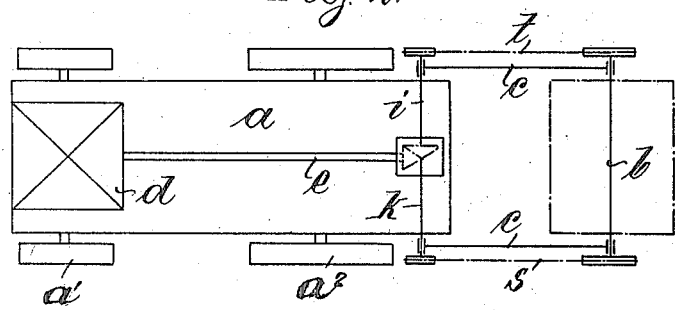
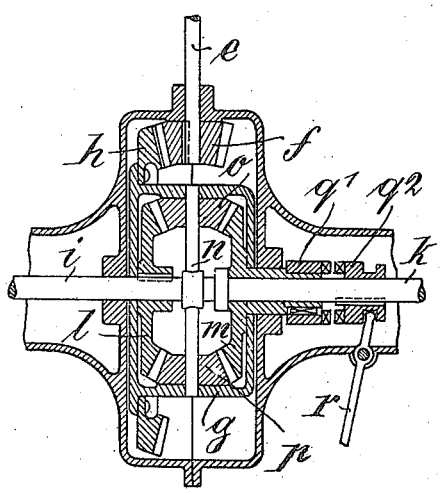
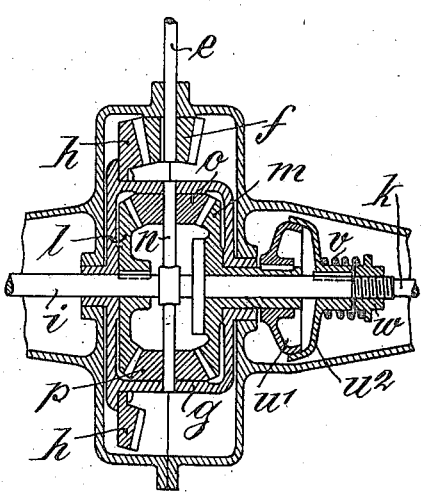

KARL HEINRICH WILHELM LUDWIG SECK, OF MANNHEIM, GERMANY, ASSIGNOR TO THE FIRM OF HEINRICH LANZ, OF MANNHEIM, GERMANY.

DRIVING MECHANISM FOR ROTARY POWER HOES OR CULTIVATORS.

1,152,558.   Specification of Letters Patent.   Patented Sept. 7, 1915.

Application filed December 11, 1912. Serial No. 736,145.

*To all whom it may concern:*

Be it known that I, KARL HEINRICH WILHELM LUDWIG SECK, subject of the German Emperor, residing at 22 Augusta Anlage, Mannheim, in the German Empire, have invented certain new and Improved Driving Mechanism for Rotary Power Hoes or Cultivators, of which the following is a specification.

This invention relates to rotary power hoes or cultivators or like agricultural implements of the type in which the power is transmitted from the prime mover to the cultivator or hoe shaft through a counter-shaft parallel to the cultivator shaft and geared up to the latter at its ends by chain gearing or the like, the cultivator shaft being a through shaft, that is to say, continuous from side to side of the machine. In cultivators of this type the cultivator shaft is liable to sag or tilt when passing over uneven ground and consequently the cultivator shaft and countershaft become non-parallel, causing the chain at one side of the machine to sag or become slack while the other chain has to transmit the whole of the power. In consequence thereof the chains become unevenly stretched and excessive wear and tear occurs.

In some cases it is usual to drive the supporting or traction wheels of the machine from the same countershaft, in which case of course a differential gearing is interposed between the countershaft and the prime mover for the purpose of enabling the machine to negotiate curves. Machines of this type however are subject to the same drawbacks owing to the fact that, when negotiating curves, the outer driving chain of the cultivator shaft will be driven at a greater speed than the inner driving chain of the cultivator shaft owing to the different peripheral speeds of the inner and outer traction wheels. Consequently a free wheel clutch has to be provided at each end of the cultivator shaft so that when negotiating curves the cultivator shaft will be driven by the outer chain while the inner chain transmits no motion. The outer chain is thus subjected to excessive strain. The same occurs when one end of the cultivator is raised in passing over an obstacle owing to the slackening of the chain at the raised end.

The object of the present invention is to avoid the foregoing disadvantages and for these purposes the counter-shaft is separate from the driving mechanism for the traction wheels of the machine so that the cultivator-shaft will be driven independently of the varying speeds of the traction wheels when negotiating curves. Moreover this separate counter-shaft is divided into two parts and a differential gear is arranged intermediate the two parts of said counter-shaft and driven from the prime mover so that unequal tension on the driving chains of the cultivator shaft will be equalized through the medium of the differential gear, thereby avoiding excessive wear and tear of the chain gearing.

In order that the cultivator shaft may be temporarily thrown out of gear a suitable clutch is preferably provided for engaging and disengaging the differential gear with the counter-shaft. This clutch may also be adapted, if desired, to automatically disengage the differential gear from the countershaft should the hoe or cultivator meet with an excessive resistance, such as large obstacles. The clutch may be adjusted to any predetermined resistance and may be adapted to automatically put the mechanism into gear after the cultivator has passed over the obstacle.

In order that the invention may be more clearly understood reference is made to the accompanying drawings, which show by way of example different forms of driving mechanism according to the present invention.

Figure 1 is a diagrammatic side view of a motor cultivator, and Fig. 2 is a plan view thereof. Fig. 3 is a detail view showing the differential gear in section. Fig. 4 is a view similar to Fig. 3, showing a slight modification thereof.

$a$ designates the frame of the motor vehicle, which is supported on wheels $a^1$ and $a^2$. Pivoted on the frame $a$ is a pair of arms $c$ carrying the through rotary-shaft $b$ of the hoe or cultivator. The shaft $b$ which is continuous from side to side of the machine is driven from the motor $d$ through the differential gear now to be described. On the end of the motor shaft $e$ (see Fig. 3), is fixed a pinion wheel $f$ gearing with a crown wheel $h$ upon a rotatable casing $g$. Coaxially mounted on the motor frame $a$ are two counter-shafts $i$ and $k$ which carry toothed wheels $l$ and $m$ respectively, rotating in the casing $g$ and gearing with planet wheels $o$ and $p$ rotatably mounted on a shaft $n$ carried by the casing $g$. The toothed wheel $m$ is not fast upon the shaft $k$ as is usually the case in differential gear, but is rotatably mounted thereon and carries one half $q'$ of a claw clutch, the other half $q^2$ of which is splined on the shaft $k$ and adapted to be operated by a forked lever $r$. The power is transmitted to the shaft $b$ from the counter-shafts $i$ and $k$ through chain and chain wheel gearing $t$ and $s$ respectively.

The mode of operation of the foregoing mechanism is as follows: When the halves $q'$ and $q^2$ of the claw clutch are thrown into engagement, the counter-shafts $i$ and $k$ are driven from the motor-shaft $e$ through the differential gear in the usual manner. If now the rotary-shaft $b$ should become inclined, thus occasioning unequal tension on the chains $s$ and $t$, this will be equalized in the usual manner through the medium of the differential gear, so that unequal tension and wear and tear of the chains will be obviated. If it is desired to temporarily put the rotary-shaft $b$ out of action, the claw clutch $q'$ $q^2$ is disengaged whereupon the wheel $m$ will rotate loosely on the shaft $k$ and will thus no longer exert a counter-acting force upon the opposite wheel $l$, with the result that the shaft $i$ will also come to rest and the gear wheels will rotate without transmitting motion. It is thus possible in a simple manner to temporarily put the rotary-shaft $b$ out of action without stopping the motor.

As illustrated in Fig. 4 an adjustable automatically disengaging friction clutch may be substituted for the claw clutch $q'$ $q^2$, the wheel $m$ carrying a friction cone $u^1$, and the other friction cone $u^2$ being splined upon the counter-shaft and maintained in contact with the friction cone $u^1$ by means of a spring $v$, the pressure of which may be regulated by an adjusting nut $w$ screwed on the shaft $k$. In this case when the resistance offered to the cultivator is normal, the friction cones will be held in engagement, thus enabling the motor-shaft $e$ to transmit motion to the counter-shafts $i$ and $k$. If the cultivator should meet an obstacle of such size that the resistance overcomes the power of the spring $v$, the friction cones $u^1$ and $u^2$ will slip one over the other with the result that the wheel $m$ will not exert a counter-acting force upon the opposite wheel $l$ and the mechanism will thus be put out of action in the manner already described, until the cultivator has passed the obstacle, whereupon the spring will automatically put the mechanism again into engagement.

I claim:—

1. A rotary cultivator comprising, in combination, a vehicle frame, wheels supporting said frame, a prime mover mounted on the frame, a separate counter-shaft divided into two parts, a differential gear intermediate the two parts of said counter-shaft and driven from said prime mover independently of the supporting wheels, a through cultivator shaft each end of which rests in a bearing of an arm pivotally supported from said frame and means for driving said through shaft from said counter-shaft.

2. A rotary cultivator comprising, in combination, a vehicle frame, wheels supporting said frame, a prime mover mounted on the frame, a separate counter-shaft divided into two parts, a differential gear intermediate the two parts of said counter-shaft and driven from said prime mover independently of the supporting wheels, a clutch intermediate said differential gear and counter-shaft for connecting and disconnecting said gear and counter-shaft, a through cultivator shaft pivotally supported from said frame and means for driving said through shaft from said counter-shaft.

3. The combination with a rotary cultivator of a prime mover, a counter-shaft divided into two parts, a differential gear intermediate the two parts of the counter-shaft and driven from said prime mover independently of the supporting wheels of the cultivator-frame, a clutch intermediate said differential gear and counter-shaft, said clutch being adapted to automatically disengage said gear and counter-shaft when said cultivator meets with excessive resistance, a through shaft carrying the cultivators and means for driving said through shaft from said counter-shaft.

4. The combination with a rotary cultivator, of a prime mover, a counter-shaft divided into two parts, a differential gear intermediate the two parts of the counter-shaft and driven from said prime mover independently of the supporting wheels of the cultivator frame, a spring-controlled friction clutch intermediate said differential gear and counter shaft adapted to automatically disengage said gear and counter shaft when said cultivator meets excessive resistance, and to reëngage said gear and counter-shaft on the diminution of said resistance, a through shaft carrying the cultivators, and means for driving said through shaft from said counter-shaft 5. The combination with a rotary cultivator, of a prime mover, two coaxial counter-shafts, a toothed wheel fixed on one end of one of said counter-shafts, a loose toothed wheel on the adjacent end of the other counter-shaft, planet wheels gearing with said fixed and loose wheels, a rotatable casing carrying said planet wheels, an annular toothed wheel carried by said casing, and driven from said prime mover independently of the supporting wheels of the cultivator frame, a clutch intermediate said loose toothed wheel and its counter shaft for enabling said loose toothed wheel to be put into or out of engagement with its counter-shaft, a through shaft carrying the cultivators, and means for driving said through shaft from said counter-shaft.

6. The combination with a rotary cultivator, of a prime mover, two coaxial counter-shafts, a toothed wheel fixed on one end of said counter-shafts, a loose toothed wheel on the adjacent end of the other counter-shaft, planet wheels gearing with said fixed and loose wheels, a rotatable casing carrying said planet wheels, an annular toothed wheel carried by said casing, and driven from said prime mover independently of the supporting wheels of the cultivator frame, a spring-controlled friction clutch intermediate said loose toothed wheel and its counter shaft for enabling said loose toothed wheel to be put into or out of engagement with its counter-shaft, a through shaft carrying the cultivators, and means for driving said through shaft from said counter-shaft.

7. The combination with a rotary cultivator, of a power-driven shaft, two coaxial counter-shafts at right angles to said power driven shaft, a toothed wheel fixed on one end of one of said counter-shafts, a loose toothed wheel on the adjacent end of the other counter-shaft, planet wheels gearing with said fixed and loose wheels, a rotatable casing carrying said planet wheels, an annular toothed wheel carried by said casing, a pinion on the end of said power-driven shaft gearing with said annular wheel, a spring controlled friction clutch intermediate said loose toothed wheel and its counter-shaft for enabling said loose toothed wheel to be put into or out of engagement with its counter-shaft, means for adjusting the transmitting power of said friction clutch, a through shaft carrying the cultivators, and means for driving said through shaft from said counter-shaft.

In testimony whereof I have affixed my signature in presence of two witnesses.

WILLY SECK.

Witnesses:
HANS MEYER,
JOSEPH PFEIFFER.

Copies of this patent may be obtained for five cents each, by addressing the "Commissioner of Patents, Washington, D. C."